United States Patent
Harada et al.

(10) Patent No.: US 8,886,256 B2
(45) Date of Patent: Nov. 11, 2014

(54) MOBILE ELECTRONIC APPARATUS, DANGER NOTIFYING METHOD, AND MEDIUM FOR STORING PROGRAM

(75) Inventors: Noriyuki Harada, Kawasaki (JP); Hiroshi Kanno, Yokohama (JP); Toshiya Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 13/535,021

(22) Filed: Jun. 27, 2012

(65) Prior Publication Data

US 2013/0029730 A1 Jan. 31, 2013

(30) Foreign Application Priority Data

Jul. 25, 2011 (JP) ................. 2011-162528

(51) Int. Cl.
*H04M 1/00* (2006.01)
*H04M 1/725* (2006.01)
*G01S 17/93* (2006.01)
*G01S 15/93* (2006.01)
*G01S 11/12* (2006.01)

(52) U.S. Cl.
CPC ...... *H04M 1/72522* (2013.01); *H04M 2250/12* (2013.01); *G01S 17/93* (2013.01); *G01S 15/93* (2013.01); *G01S 11/12* (2013.01)
USPC .... 455/566; 455/90.1; 455/404.2; 455/412.1; 455/456.1; 455/457; 455/550.1; 340/467; 340/933; 701/26; 701/117; 701/300

(58) Field of Classification Search
CPC ..... H04W 76/007; H04W 4/12; H04W 64/00; H04M 1/0241; H04M 1/72519; G08G 1/42; B60Q 1/44; G05D 1/272; G05D 1/104; G05D 7/78
USPC ......... 455/404.2, 412.1, 0.2, 456.1–457, 566, 455/90.1, 550.1; 340/467, 933; 701/26, 701/117, 300

See application file for complete search history.

(56) References Cited

U.S. PATENT DOCUMENTS

| | | | | |
|---|---|---|---|---|
| 5,612,883 | A * | 3/1997 | Shaffer et al. | 701/300 |
| 6,590,495 | B1 * | 7/2003 | Behbehani | 340/435 |
| 6,850,156 | B2 * | 2/2005 | Bloomfield et al. | 340/467 |
| 6,963,657 | B1 * | 11/2005 | Nishigaki et al. | 382/106 |
| 7,095,336 | B2 * | 8/2006 | Rodgers et al. | 340/903 |
| 7,170,548 | B2 * | 1/2007 | Ishikawa | 348/148 |
| 7,308,247 | B2 * | 12/2007 | Thompson et al. | 455/404.2 |
| 7,388,516 | B2 * | 6/2008 | Yokota et al. | 340/933 |

(Continued)

FOREIGN PATENT DOCUMENTS

| | | | |
|---|---|---|---|
| JP | 2003-329479 | A | 11/2003 |
| JP | 2004-304297 | A | 10/2004 |
| JP | 2008-187700 | A | 8/2008 |
| JP | 2009-015494 | A | 1/2009 |

*Primary Examiner* — Steve D Agosta
(74) *Attorney, Agent, or Firm* — Maschoff Brennan

(57) ABSTRACT

A mobile electronic apparatus includes a memory that stores a search range of an object and a processor that executes a process. The process includes acquiring a moving speed of the mobile electronic apparatus, determining the search range of the object on a basis of the moving speed, detecting the object existing within the search range, detecting whether a display unit of the mobile electronic apparatus is in an active state, and notifying that the object is detected when the display unit is detected to be in the active state and the object existing within the search range is detected.

6 Claims, 13 Drawing Sheets

(56) References Cited

U.S. PATENT DOCUMENTS

| | | | |
|---|---|---|---|
| 8,412,445 B2* | 4/2013 | Uyeki | 701/117 |
| 2004/0121783 A1* | 6/2004 | Chua et al. | 455/456.1 |
| 2006/0058921 A1* | 3/2006 | Okamoto | 700/255 |
| 2007/0085993 A1* | 4/2007 | Brown | 356/3 |
| 2010/0041383 A1* | 2/2010 | Fournier | 455/418 |
| 2010/0087137 A1* | 4/2010 | Fischer et al. | 455/1 |
| 2010/0222954 A1* | 9/2010 | Ichinose et al. | 701/26 |
| 2011/0039572 A1* | 2/2011 | Lamb et al. | 455/456.1 |

* cited by examiner

FIG. 6

THRESHOLD VALUE TABLE

| WALKING SPEED [km/h] | THRESHOLD VALUE [m] |
|---|---|
| LESS THAN 3.0 | 2 |
| 3.0 OR MORE, LESS THAN 3.5 | 2.5 |
| 3.5 OR MORE, LESS THAN 4.0 | 3 |
| 4.0 OR MORE, LESS THAN 4.5 | 3.5 |
| 4.5 OR MORE | 4 |

MOBILE ELECTRONIC APPARATUS, DANGER NOTIFYING METHOD, AND MEDIUM FOR STORING PROGRAM

CROSS-REFERENCE TO RELATED APPLICATION

This application is based upon and claims the benefit of priority from the prior Japanese Patent Application No. 2011-162528 filed on Jul. 25, 2011, the entire contents of which are incorporated herein by reference.

FIELD

The embodiments discussed herein are related to a mobile electronic apparatus, a danger notifying method, and a medium for storing a program.

BACKGROUND

In recent years, more users of mobile electronic apparatuses, such a mobile phone, keep looking at a display unit of the mobile phone while walking, and many users of the mobile electronic apparatus collide against obstacles, for example, oncoming walkers. There is a proposition of a mobile electronic apparatus that detects an obstacle to be avoided by using a mounted camera or the like to avoid collision with the obstacle.

PATENT DOCUMENT

Japanese Laid-open Patent Publication No. 2004-304297
Regarding the conventional mobile electronic apparatus, a detection range for detecting an obstacle to be avoided is fixed regardless of a walking speed of a user. As a result, depending on the walking speed of the user, obstacle collision may not be sufficiently avoided.

The disclosed technique avoids collision that occurs when the user of the mobile electronic apparatus is walking while looking at a display unit.

SUMMARY

According to an aspect of the invention, a mobile electronic apparatus includes a memory that stores a search range of an object and a processor that executes a process. The process includes acquiring a moving speed of the mobile electronic apparatus, determining the search range of the object on a basis of the moving speed, detecting the object existing within the search range, detecting whether a display unit of the mobile electronic apparatus is in an active state, and notifying that the object is detected when the display unit is detected to be in the active state and the object existing within the search range is detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a threshold value table in which the walking speed corresponds to a threshold value according to the first embodiment;

DESCRIPTION OF EMBODIMENTS

First Embodiment

With reference to FIGS. 1 to 8, a first embodiment will be described.

[Hardware of Mobile Phone]

Figure 1:
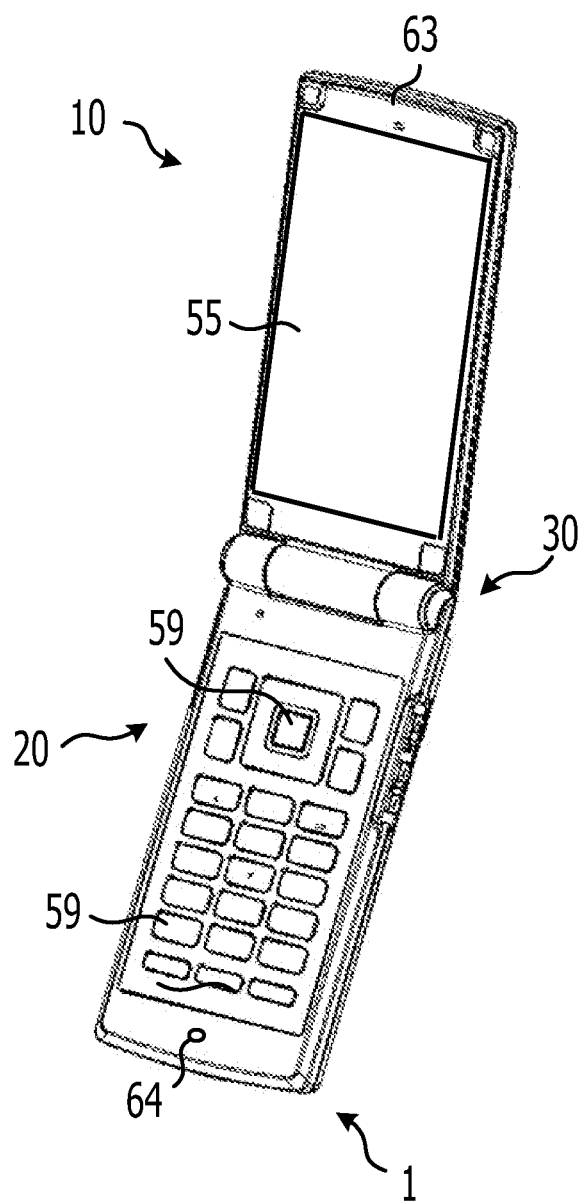
FIG. 1 is an entire diagram of a mobile phone according to a first embodiment.
Figure 2:
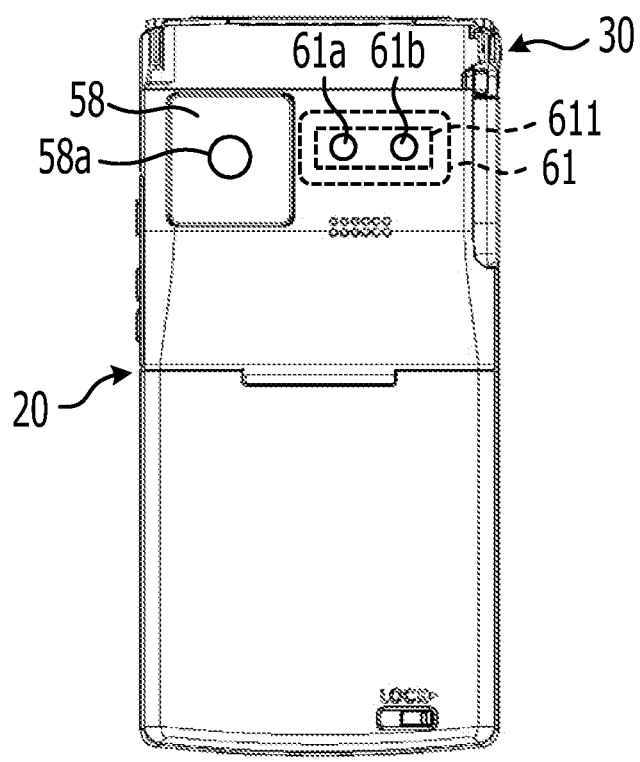
FIG. 2 is a back side diagram of a lower housing according to the first embodiment.
Figure 3:
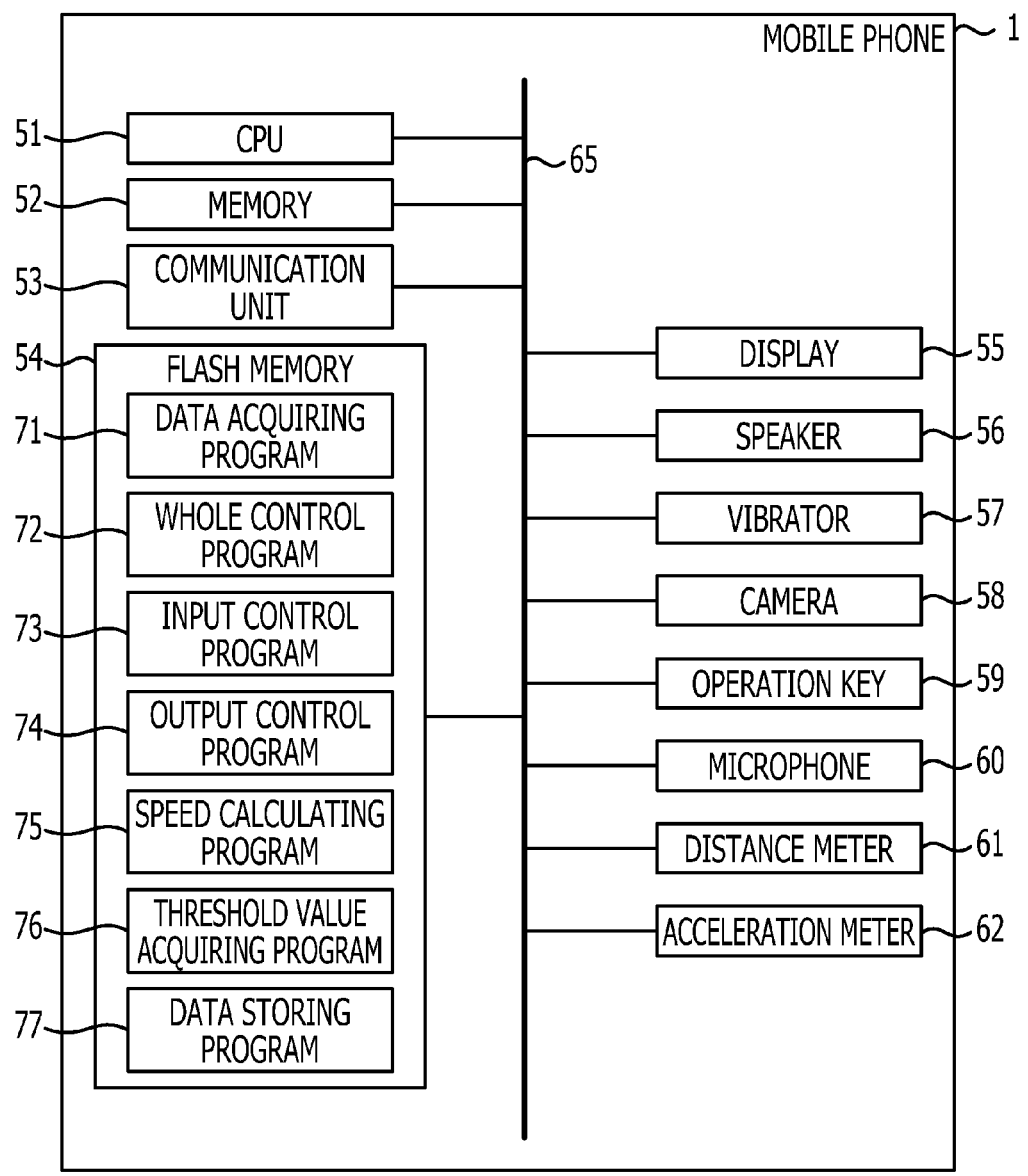
FIG. 3 is a hardware configuration diagram of the mobile phone according to the first embodiment.

FIG. 1 is an entire diagram of a mobile phone 1 according to the first embodiment. FIG. 2 is a back side diagram of a lower housing 20 according to the first embodiment. FIG. 3 is a hardware configuration diagram of the mobile phone 1 according to the first embodiment.

As illustrated in FIGS. 1 to 3, the mobile phone 1 according to the first embodiment includes an upper housing 10 that is touched to a user's ear and a lower housing 20 that is held by a user's hand. The upper housing 10 and the lower housing 20 are coupled with each other to be foldable at a hinge part 30 in the center. As described below, a surface that is hidden when the mobile phone 1 with the upper housing 10 and the lower housing 20 are folded is referred to as a surface, and a surface that is exposed when the mobile phone is folded is referred to as a back surface.

The mobile phone 1 includes a Central Processing Unit (CPU) 51, a memory 52, a communication unit 53, a flash memory 54, a display 55, a speaker 56, a vibrator 57, a camera 58, an operation key 59, a microphone 60, a distance meter 61, an acceleration meter 62, a mouth piece 64, and an ear piece 63.

The CPU 51, the memory 52, the communication unit 53, the flash memory 54, the display 55, the speaker 56, the vibrator 57, the camera, the operation key 59, the microphone 60, the distance meter 61, and the acceleration meter 62 are coupled with each other by a bus 65.

By reading out various programs stored in the flash memory 54, developing the programs in the memory 52, and executing the programs developed in the memory 52, the CPU 51 achieves various functions described below.

The memory 52 stores the various programs read out from the flash memory 54 by the CPU 51 and the data that is used to execute the various functions by the CPU 51. The communication unit 53 is used as an interface that is radio-coupled to a mobile phone network.

The flash memory 54 stores various programs such as a data acquiring program 71, a whole control program 72, an input control program 73, an output control program 74, a speed calculating program 75, a threshold value acquiring program 76, and a data storing program 77. Regarding the flash memory 54, the area for arbitrary use is used as a data storage unit 150 described below.

The display 55 is mounted on the surface of the upper housing 10 and displays, for example, various programs such as a menu display. The display 55 displays obstacle information that notifies the user of the existence of the obstacle described below.

The speaker 56, which is provided inside the upper housing 10, emits a voice from, for example, a conversation destination through the ear piece 63. Furthermore, the speaker 56 emits an alarm sound to notify the user of the existence of the obstacle.

The vibrator 57 generates vibration to notify the user of an incoming call. Furthermore, the vibrator 57 generates vibration to notify the user of the existence of the obstacle, for example.

The camera 58, which is mounted on the lower housing 20, photographs the front of the lens 58a allocated on the back surface of the lower housing 20. The operation key 59 is used as, for example, a push button that is used to input a telephone number or as a selection button that is used to select a function. The microphone 60 is provided inside the lower housing 20 and receives voice from a user through the ear piece 63.

The distance meter 61 meters the distance to an obstacle. The distance meter 61 may employ an ultrasonic method, an optical method, or the like. For example, a stereo camera 611 includes a lens 61a and a lens 61b and photographs the front of the lenses 61a and 61b, respectively. The acceleration meter 62, which is provided inside the upper housing 10 or the lower housing 20, detects (samples) acceleration values Xi, Yi, and Zi in XYZ directions that are mutually orthogonal in a predetermined period of time.

[Functional Block of Mobile Phone]

Figure 4:
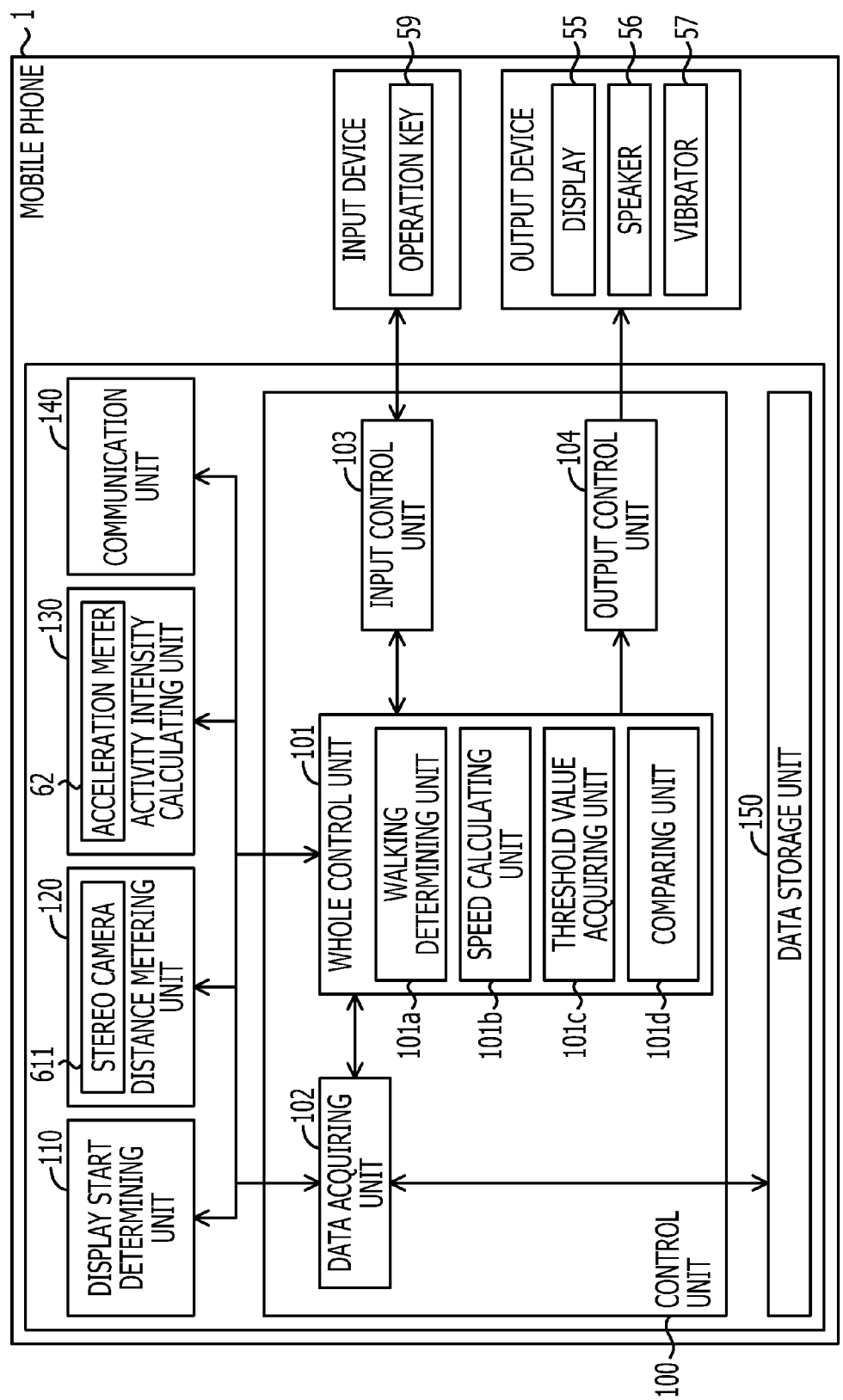
FIG. 4 is a functional block diagram of the mobile phone according to the first embodiment.

FIG. 4 is a functional block diagram of the mobile phone 1 according to the first embodiment.

As illustrated in FIG. 4, the mobile phone 1 includes a control unit 100, a display start determining unit 110, a distance metering unit 120, an activity intensity calculating unit 130, a communication unit 140, and a data storage unit 150. The control unit 100 further includes a whole control unit 101, a data acquiring unit 102, an input control unit 103, and an output control unit 104.

The whole control unit 101 includes a walking determining unit 101a, a speed calculating unit 101b, a threshold value acquiring unit 101c, and a comparing unit 101d. The various functions of the whole control unit 101 are executed by the CPU 51 based on the whole control program 72.

Based on the below-described activity intensity stored in the data storage unit 150 and on the existence of periodicity and the acceleration value and the frequency stored in the data storage unit 150, the walking determining unit 101a determines whether or not the user of the mobile phone 1 is walking.

Based on the activity intensity calculated by the activity intensity calculating unit 130 and on the below-described parameter stored in the data storage unit 150, the speed calculating unit 101b acquires the maximum value of walking speed of the user of the mobile phone 1. In the first embodiment, since the walking speed is calculated based on the activity intensity, walking that is almost like stepping is measured as the activity intensity. Therefore, according to the first embodiment, the maximum value of walking speed indicates the walking speed in a case where the user is assumed to be walking forward. The details will be described below.

Based on the walking speed acquired by the speed calculating unit 101b and on the threshold table described below stored in the data storage unit 150, the threshold value acquiring unit 101c acquires the distance, as a threshold value, to detect an obstacle to be avoided.

The comparing unit 101d compares the distance to the obstacle to be avoided metered by the distance metering unit 120 to the threshold value acquired by the threshold value acquiring unit 101c. That is, the comparing unit 101d detects an obstacle existing closer than the threshold value in cooperation with the distance metering unit 120.

The data acquiring unit 102 sends a request to start processing to the display start determining unit 110, the distance metering unit 120, and the activity intensity calculating unit 130, respectively, and receives processing results from the display start determining unit 110, the distance metering unit 120, and the activity intensity calculating unit 130, respectively. The data acquiring unit 102 is achieved by the CPU 51 based on the data acquiring program 71.

The input control unit 103 controls the input device such as the operation key 59 and the like. The input control unit 103 is achieved by the CPU 51 based on the input control program 73.

The output control unit 104 controls output devices such as the display 55, the speaker 56, and the vibrator 57. The output control unit 104 is achieved by the CPU 51 based on the output control program 74.

Based on the display start information stored in the data storage unit 150, the display start determining unit 110 determines whether or not the display 55 is in an active state. The active state means that a power of the display 55 or a back light of the display 55 is turned on. Therefore, the display start information means whether the power of the display 55 or the back light (not illustrated) of the display 55 is turned on or off. Based on the device driver of the display 55, the display start information stored in the data storage unit 150 is rewritten by the CPU 51 when the power of the display 55 or the back light of the display 55 is turned on or off.

If the display start determining unit 110 determines that the display 55 is in the active state and if the walking determining unit 101a determines that the user is walking, the distance metering unit 120 meters the distance to the obstacle in front of the user of the mobile phone 1 based on the photograph information that is photographed by the distance meter 61, for example, the stereo camera 611. At this time, the distance metering unit 120 may meter the distance to the obstacle by applying, for example, a principal of triangulation or the like to two pieces of the photograph information photographed by the lenses 61a and 61b of the stereo camera 611.

Based on the acceleration value metered by the acceleration meter 62, the activity intensity calculating unit 130 calculates the activity intensity of the user of the mobile phone 1. For example, the activity intensity calculating unit 130 may calculate the activity intensity of the user by using Formula [1]. According to Formula [1], "n" is the number of samplings of acceleration value per unit time, and "X", "Y," and "Z" indicate acceleration values in the X, Y, and Z directions, respectively. The unit of the acceleration value is not particularly limited. According to the first embodiment, the unit is, for example, m/second$^2$.

[Numeral 1]

$$\text{Activity Intensity} = g\left[\left\{\frac{1}{n-1}\left[\left(\sum_{i=0}^{n} xi^2 + \sum_{i=0}^{n} yi^2 + \sum_{i=0}^{n} zi^2\right) - \frac{1}{n}\left\{\left(\sum_{i=0}^{n} xi\right)^2 + \left(\sum_{i=0}^{n} yi\right)^2 + \left(\sum_{i=0}^{n} zi\right)^2\right\}\right]\right\}^{\frac{1}{2}}\right] \quad [1]$$

Regarding Formula [1], g (x) is a liner function that calculates an activity intensity [Mets] based on a plurality of acceleration values that is sequentially obtained.

Specifically, from among the plurality of acceleration values stored in the data storage unit 150, the activity intensity calculating unit 130 substitutes the acceleration values Xi, Yi, and Zi (i=0, 1, etc. and n) for the number n of the samplings into Formula [1]. The number "n" of samplings and the acceleration values Xi, Yi, and Zi are stored in the data storage unit 150.

The formula for calculating the activity intensity is not limited to Formula [1]. For example, the formula is expressed as a function f of "Xi," "Yi," and "Zi" (i=0, 1, etc., and n), that is, f (X0, X1, etc., and Xn, Y0, Y1, etc., and Yn, and Z0, Z1, etc., and Zn). When the number "n" of samplings of the acceleration value per unit time and the acceleration values "Xi," "Yi," and "Zi" (i=0, 1, etc., and n) are input into the X direction, the Y direction, and the Z direction in each of the samplings, other formulas except Formula [1] may be employed if the formula calculates the activity intensity per unit time. Formula [1] is an example of the function f.

The communication unit 140 is radio-coupled to the mobile phone network to achieve communication functions such as a telephone conversation, a mail, and the Internet.

The data storage unit 150 stores the acceleration values "Xi," "Yi," and "Zi" (i=0, 1, etc., and n) detected by the acceleration meter 62, and the number "n" of samplings of the acceleration value per unit time. If the number of detection by the acceleration meter 62 reaches the number "n" of samplings, every time another acceleration value is detected, the latest acceleration value may be stored after the oldest acceleration value may be deleted, that is, upgrading may be performed.

The data storage unit 150 stores the activity intensity calculated by the activity intensity calculating unit 130 in correspondence to calculation time. The data storage unit 150 further stores an average landing period obtained when a walker lands his/her foot. According to the first embodiment, the range of the landing period is, for example, 1 Hz/second to 2 Hz/second.

The data storage unit 150 further stores the parameter of the relational formula of the activity intensity and the walking speed of an average walker. The parameter will be simply described below.

Figure 5:
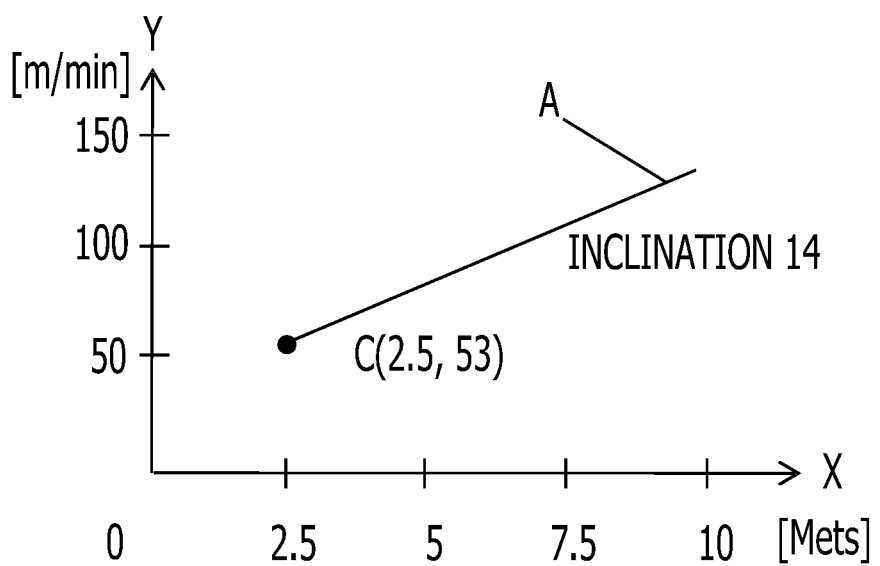
FIG. 5 is a graph of a relational formula of an activity intensity and a walking speed according to the first embodiment.

FIG. 5 is a graph of a relative formula of the activity intensity and the walking speed according to the first embodiment.

As illustrated in FIG. 5, if the activity intensity is plotted on an X axis and the walking speed is plotted on a Y axis, the activity intensity and the walking speed of an average walker satisfy Formula [2]. Therefore, the data storage unit 150 according to the first embodiment stores an inclination 14, as a parameter, of the straight line 14 expressed by Formula [2] and a coordinate C (2.5, 53) where a straight line A passes.

[Numeral 2]

$$y - 53 = 14(x - 2.5) \quad [2]$$

The data storage unit 150 further stores a threshold value table in which the walking speed of an average walker corresponds to the detection range of an obstacle, that is, the threshold value. The threshold value table will be described below.

FIG. 6 illustrates the threshold value table in which the walking speed corresponds to the threshold value according to the first embodiment.

As illustrated in FIG. 6, in the threshold value table, the walking speed "Less than 3.0 km/h" corresponds to the threshold value "2," and the walking speed "3.0 km/h or more, less than 3.5 km/h" corresponds to the threshold value "2.5 m". Moreover, the walking speed "3.5 km/h or more, less than 4 km/h" corresponds to the threshold value "3 m," the walking speed "4 km/h or more, less than 4.5 km/h" corresponds to the threshold value "3.5 m," and the walking speed "4.5 km/h or more" corresponds to the threshold value "4 m."

[Collision Avoiding Process]

Figure 7:
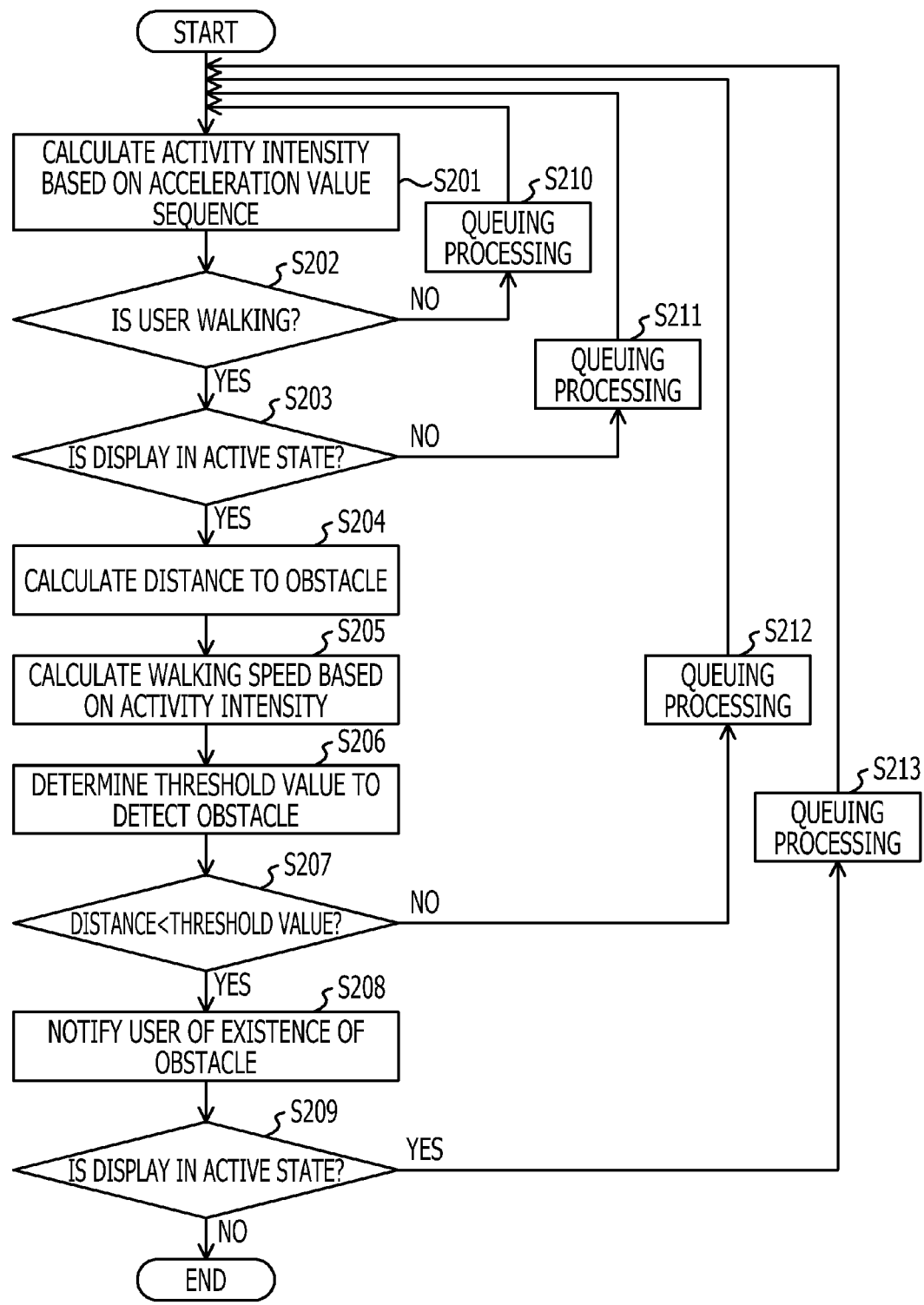
FIG. 7 is a flowchart of a collision avoiding process according to the first embodiment.

FIG. 7 is a flowchart of the collision avoiding process according to the first embodiment.

When the power of the mobile phone 1 is turned on, as illustrated in FIG. 7, the activity intensity calculating unit 130 starts calculating the activity intensity of the user of the mobile phone 1 based on the acceleration value metered by the acceleration meter 62 (Operation S201). The activity intensity is calculated in a predetermined period of time, for example, 40 m seconds and is then sequentially stored in the data storage unit 150.

Based on the activity intensity calculated by the activity intensity calculating unit 130 and on the landing period stored in the data storage unit 150, the walking determining unit 101*a* determines whether or not the user of the mobile phone 1 is walking (Operation S202). The determination will be simply described below.

Figure 8:
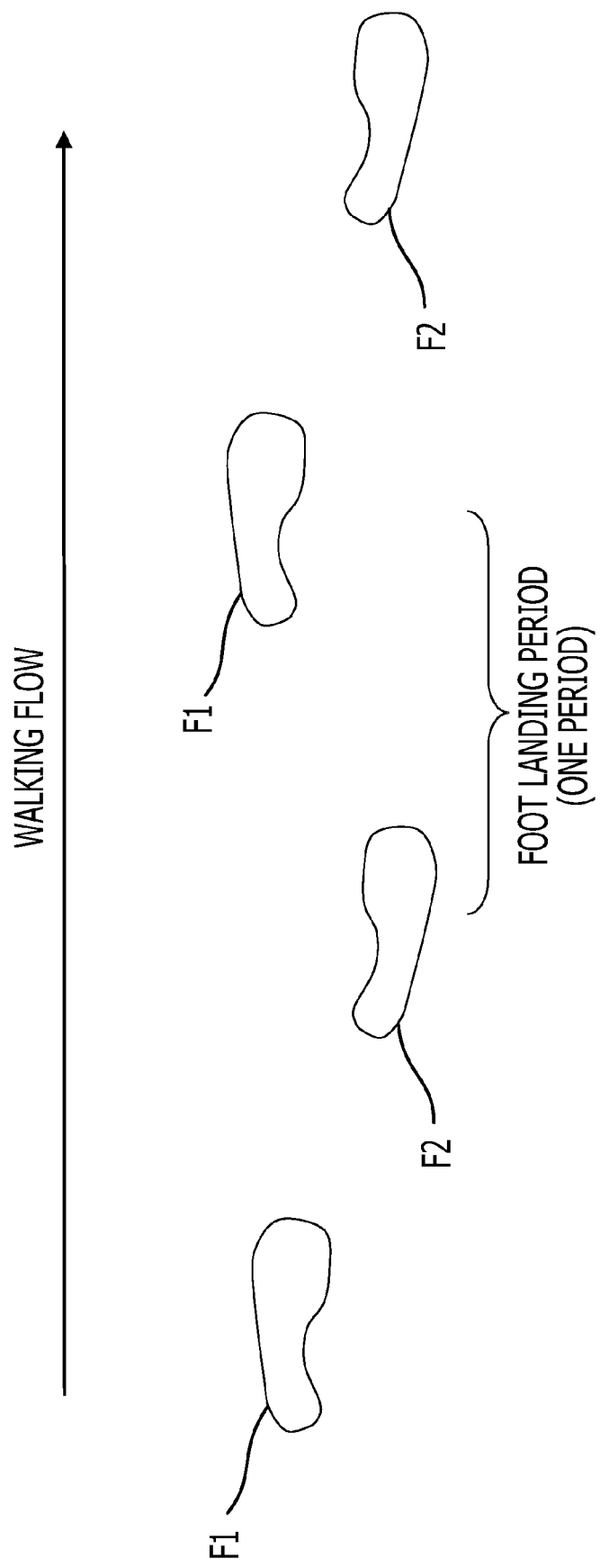
FIG. 8 is an explanatory diagram of an idea of foot landing period of a walking user according to the first embodiment.

FIG. 8 is an explanatory diagram of an idea of landing period of a foot of a walking user according to the first embodiment.

As illustrated in FIG. 8, a landing period indicates a period of time after the landing of a foot F1, one foot of the user, before the landing of a foot F2, the other foot of the user.

If the determination indicates that the user is walking (Yes in Operation S202), the display start determining unit 110 determines whether or not the display 55 is in the active state based on the display start information stored in the data storage unit 150 (Operation S203). The display start information stored in the data storage unit 150 is updated by the device driver of the display 55, for example, every time the power of the display 55 or the back light of the display 55 is turned on or off.

On the other hand, if the determination indicates that the user is not walking (No in Operation S202), queuing processing is performed for a predetermined period of time, for example several hundred milli seconds, to calculate the activity intensity again (Operation S201).

If the determination indicates that the display 55 is in the active state (Yes in Operation S203), the distance metering unit 120 meters the distance to the obstacle in front of the stereo camera 611 based on two pieces of the photograph information photographed by the distance meter 61, for example, the lenses 61*a* and 61*b* of the stereo camera 611 (Operation S204). The distance to the obstacle is metered in a predetermined period of time, for example, several hundred milli seconds.

On the other hand, if the determination indicates that the display 55 is not in the active state (No in Operation S203), the queuing processing is performed for a predetermined period of time, for example, several hundred milli seconds (Operation S211). The activity intensity calculating unit 130 calculates the activity intensity again (Operation S201).

Based on the activity intensity calculated by the activity intensity calculating unit 130 and on the parameter of the relational formula of the activity intensity and the walking speed stored in the data storage unit 150, the speed calculating unit 101b calculates the walking speed of the user of the mobile phone 1 (Operation S205). That is, by using the relational formula of the activity intensity and the walking speed, the speed calculating unit 101b calculates the walking speed of the user of the mobile phone 1 corresponding to the activity intensity calculated by the activity intensity calculating unit 130. According to the first embodiment, for example, the inclination 14 of the straight line A expressed in [Numeral 2] and a coordinate C (2.5, 53) where the straight line A passes are used as a parameter.

Based on the walking speed calculated by the speed calculating unit 101b and on the threshold table stored in the data storage unit 150, the threshold value acquiring unit 101c acquires the detection range in which the obstacle to be avoided is detected, that is, the threshold value (Operation S206). For example, as illustrated in FIG. 6, if the walking speed calculated by the speed calculating unit 101b is approximately 3.0 [km/m], the threshold value used to detect the obstacle is 2.5 [m] and if the walking speed calculated by the speed calculating unit 101b is approximately 4.0 [km/m], the threshold value used to detect the obstacle is 3.5 [m].

The comparing unit 101d compares the distance to the obstacle metered by the distance metering unit 120 to the threshold value acquired by the threshold value acquiring unit 101c (Operation S207).

If the distance to the obstacle is smaller than the threshold value (Yes in Operation S207), the output control unit 104 outputs an alarm signal to one of the display 55, the speaker 56, and the vibrator 57 (Operation S208). Based on the alarm signal, at least one of the display 55, the speaker 56, and the vibrator 57 notifies the user that the obstacle is coming close. On the other hand, if the distance to the obstacle is larger than the threshold value (No in Operation S207), the output control unit 104 performs the queuing processing for a predetermined period of time, for example, several hundred milli seconds (Operation S212). The activity intensity calculating unit 130 calculates the activity intensity again (Operation S201).

Based on the display start information of the display 55 stored in the data storage unit 150, the display start determining unit 110 determines whether the display 55 is in the active state (Operation S209).

If the determination indicates that the display 55 is not in the active state (No in Operation S209), the control unit 100 ends the collision avoiding process. On the other hand, if the determination indicates that the display 55 is in the active state (Yes in Operation S209), the display start determining unit 110 performs the queuing processing for a predetermined period of time, for example, several hundred m seconds (Operation S213). The activity intensity calculating unit 130 calculates the activity intensity again (Operation S201).

As described above, according to the first embodiment, depending on the walking speed of the user of the mobile phone 1, the detection range in which the obstacle to be avoided is detected, that is, the threshold value is changed. As a result, regardless of the walking speed of the user of the mobile phone 1, the collision with the obstacle may be avoided.

According to the first embodiment, simply if the determination indicates that the display 55 of the mobile phone 1 is in the active state, that is, simply if the user easily fails to pay attention to the front while looking at the display 55, the obstacle to be avoided is detected. Therefore, if the user is not looking at the display 55, that is, if there is no need to notify the user of the existence of the obstacle to be avoided, the collision avoiding process may be stopped.

Furthermore, according to the first embodiment, simply if the obstacle is coming close to the user of the mobile phone 1, the user is notified of the existence of the obstacle to be avoided. That is, according to the first embodiment, the mobile phone 1 does not provide the user with the existence information of the obstacle by displaying the front image on the display 55 all the time. Therefore, the user may pay attention to the obstacle when the obstacle is coming close. In other cases, the user may not keep paying too much attention to the obstacle.

According to the first embodiment, based on the activity intensity of the user of the mobile phone 1 and on the relation between the activity intensity and the walking speed, the walking speed of the user is calculated. Therefore, the walking speed of the user is easily calculated. Moreover, since the maximum value of the walking speed is acquired, the collision with the obstacle may be avoided more reliably.

In the first embodiment, the mobile phone 1 has been described as an example of mobile electronic apparatus. However, the present invention is not limited to the first embodiment. For example, a portable navigation device is used as a mobile electronic apparatus.

According to the first embodiment, the power supply of the mobile phone 1 as a trigger starts the collision avoiding process. However, the present invention is not limited to the first embodiment. For example, the power supply of the display 55 or the back light of the display 55 as a trigger may start the collision avoiding process. If the power supply of the display 55 or the back right of the display 55 as a trigger starts the collision avoiding process, the activity intensity is acquired while the user is looking at the display 55. That is, when it is estimated that the user is not looking at the display 55, the activity intensity is not acquired. As a result, the power saving of the mobile phone 1 may be achieved.

Furthermore, hand-operated power supply of the mobile phone 1 as a trigger may start the collision avoiding process. If the collision avoiding process is started when the power of the mobile phone 1 is manually turned on, the collision avoiding process is not started unless the power of the display 55 or the back light of the display 55 is hand-operated supplied even if the power of the display 55 or the back light of the display 55 is set to be supplied. That is, simply if it is estimated that the user is assumed to be looking at the display 55, the collision avoiding process may be started. As a result, the power saving of the mobile phone 1 is further achieved.

According to the first embodiment, the mobile phone 1 starts the collision avoiding process when the power of the display 55 or the back light of the display 55 is supplied as a trigger. However, the present invention is not limited to the first embodiment. For example, simply if the power of the display 55 or the back light of the display 55 is supplied and if the determination indicates that the user is walking, the mobile phone 1 may start the collision avoiding process. The mobile phone 1 may achieve the flow of the collision avoiding process by using a power flag that is set when the power of the display 55 or the back light of the display 55 is supplied and a walking flag that is set when the determination indicates that the user is walking. If either the power flag or the walking flag is set, checking if the other flag is set may be performed.

In the first embodiment, the stereo camera 611 is used to meter the distance to the obstacle in front of the mobile phone 1. However, the present invention is not limited to the second embodiment. For example, an ultrasound distance meter or an optical distance meter may be used. The ultrasound meter or the optical meter may meter the distance between the mobile phone 1 and the obstacle based on a transmission time of an ultrasound beam or a laser beam and on a reception time of the ultrasound beam or the laser beam that is reflected by the obstacle. By changing the reflection angle of the ultrasound beam or the laser beam, the distance from the mobile phone 1 to the obstacle is detected for each of the reflections angles. The obstacle to be avoided may be detected in a wide range of the front of the mobile phone 1.

In the first embodiment, the type of the obstacle to be avoided is not specified. However, the present invention is not limited to the first embodiment. For example, to avoid the collision with an oncoming walker, the collision avoiding process may be started simply if a human face or a part of the human face is detected within the detection range by using an image recognizing technique.

According to the first embodiment, the stereo camera 611 is mounted on the lower housing 20. If the stereo camera 611 may photograph at least the front of the user when the user is walking while looking at the display 55 of the mobile phone 1, the mounting position and the mounting form of the stereo camera 611 are not limited.

In the first embodiment, to notify the user of the obstacle coming close to be avoided, one of the display 55, the speaker 56, and the vibrator 57 is used. However, the present invention is not limited to the first embodiment. For example, a light-emitting body such as a Light Emitting Diode (LED) mounted on the mobile phone 1 may be used.

In the first embodiment, based on the acceleration value detected by the acceleration meter 62, the activity intensity of the user of the mobile phone 1 is calculated. However, the present invention is not limited to the first embodiment. In the similar manner, according to the first embodiment, based on the activity intensity calculated by the activity intensity calculating unit 130, the walking speed of the user of the mobile phone 1 is calculated. However, the present invention is not limited to the first embodiment.

Second Embodiment

With reference to FIGS. 9 to 12, a second embodiment will be described below. If the configurations and functions are equivalent to the first embodiment, the description may be omitted.

The mobile phone 1 according to the first embodiment notifies the user of the existence of the obstacle by at least one of the display 55, the speaker 56, and the vibrator 57. The mobile phone 1 according to the second embodiment displays the position of the obstacle, the collision avoiding method, or the like on the display 55.

Figure 9:
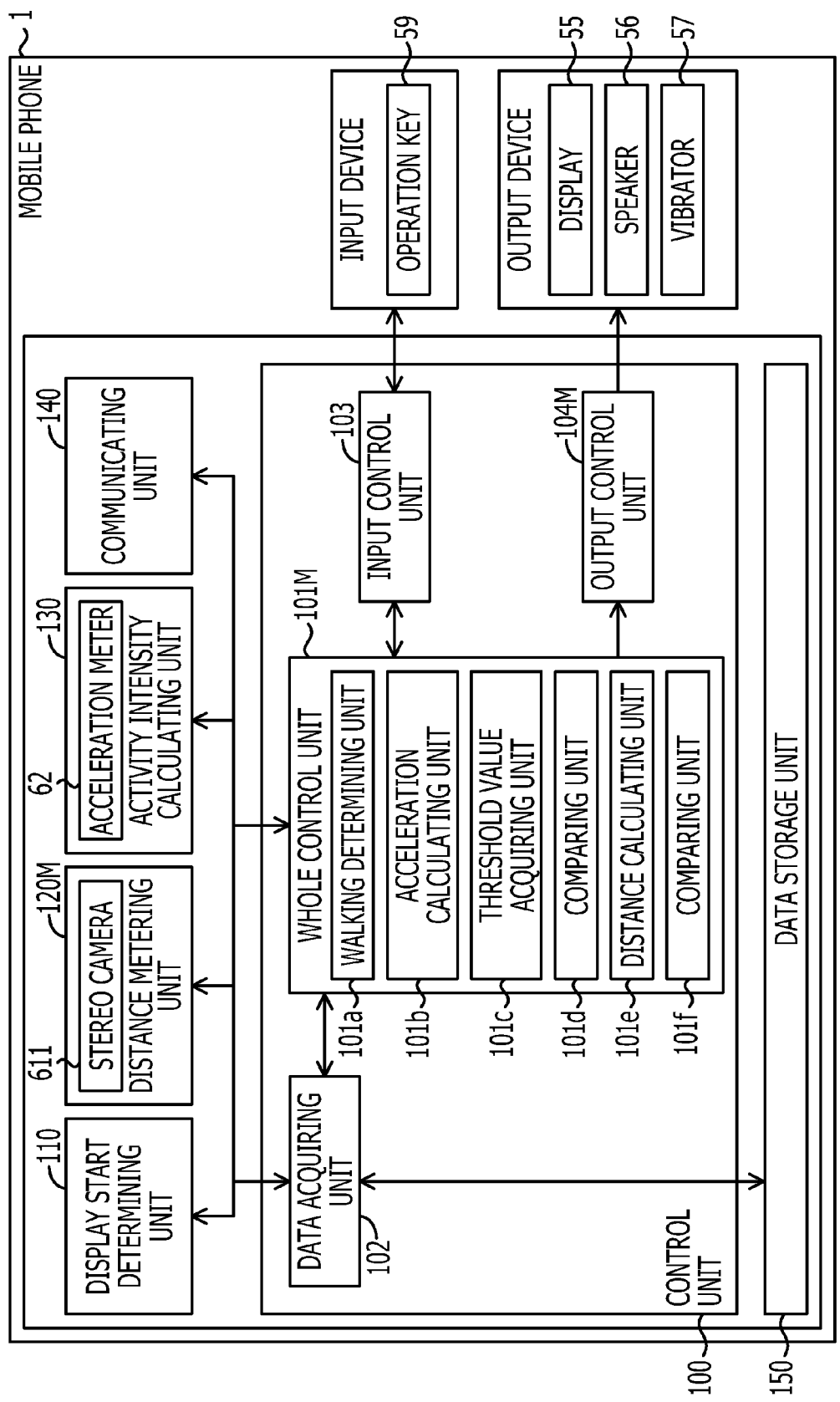
FIG. 9 is a functional block of a mobile phone according to a second embodiment.

FIG. 9 is a functional block diagram of the mobile phone 1 according to the second embodiment.

As illustrated in FIG. 9, a whole control unit 101M according to the second embodiment further includes a distance calculating unit 101e and a comparing unit 101f. A distance metering unit 120M meters an angle θ1 of the obstacle O1 obtained based on the walk path P of the user of the mobile phone 1 as a standard.

When the distance metering unit 120M meters a distance by using the ultrasound distance meter or the optical distance meter, the angle θ1 is equal to the reflection angle obtained by metering the distance from the mobile phone 1 to the obstacle O1 based on the transmission time and on the reception time of the reflection wave that is reflected by the obstacle. The acceleration meter 130 may meter the distance of each reflection angle by changing the reflection angle with respect to simply a horizontal direction. If the stereo camera is used, the outlines of the objects of two images are recognized and compared with each other, so that the distance may be calculated according to a shift of a dot position. In this case, the angle θ1 is desired according to the dot position of each of the outlines. If a distance such as several meters is metered, the base line length may be several centimeters. The acceleration meter may meter the distance for each of the reflection angles by changing the reflection angle with respect to simply the horizontal direction. Regarding the range of the angle θ1, the threshold value may vary according to the speed.

Regarding the change of the threshold value, for example, the walking speed "Less than 3.0 km/h" corresponds to the threshold value "±90° ahead," the walking speed "3.0 km/h or more, less than 3.5 km/h" corresponds to the threshold value "±70° ahead," the walking speed "3.5 km/h or more, less than 4 km/h" corresponds to the threshold value "±60° ahead," the walking speed "4 km/h or more, less than 4.5 km/h" corresponds to the threshold value "±50° ahead," and the walking speed "4.5 km/h or more" corresponds to the threshold value "±40° ahead."

The walk path P is assumed to be a path on which the user walks. Therefore, when the user holds the mobile phone and looks at the display, the display is not vertical in most cases. Therefore, the upper direction of the display is the front direction, and the path extending forward in a straight line is the walk path P. Furthermore, according to the moving speed, the data storage unit 150 stores the distance, as a threshold value d0, in which the user does not collide against the obstacle O1 while walking on the walk path P.

Based on a distance L1 to the obstacle O1 and on the angle θ1 of the obstacle O1, the distance calculating unit 101e calculates the distance d1 between the obstacle O1 and the walk path P. For example, by multiplying the distance L1 to the obstacle O1 metered by the distance metering unit 120M by the sine of the angle θ1 of the obstacle O1 metered by the distance metering unit 120M, that is, sin θ1, the distance calculating unit 101e calculates the distance d1 between the obstacle O1 and the walk path P.

The comparing unit 101f compares the distance d1 calculated by the distance calculating unit 101e to the threshold value d0 stored in the data storage unit 150.

Based on a comparison result obtained by comparing the distance d1 calculated by the distance calculating unit 101e to the threshold value d0 stored in the data storage unit 150, an output control unit 104M displays the obstacle information such as a position, a direction of the obstacle, the collision avoiding method, and the like on the display 55.

[Generating Process of Collision Avoiding Method]

Figure 10:
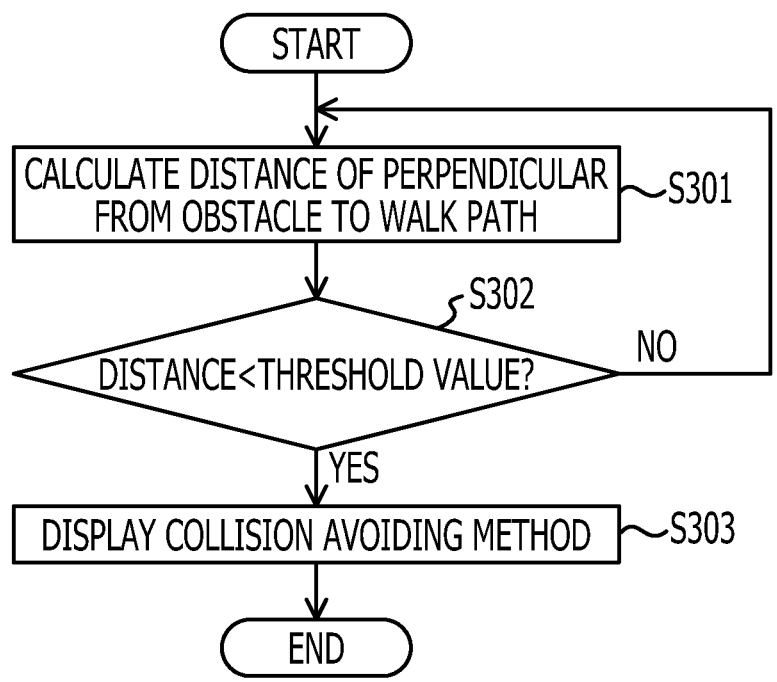
FIG. 10 is a flowchart of a display process of a collision avoiding method according to the second embodiment.
Figure 11A:
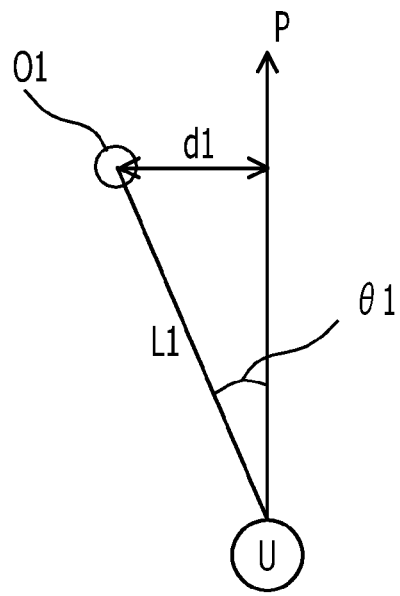
FIGS. 11A and 11B are overview diagrams illustrating a display content of the mobile phone according to the second embodiment.
Figure 11B:
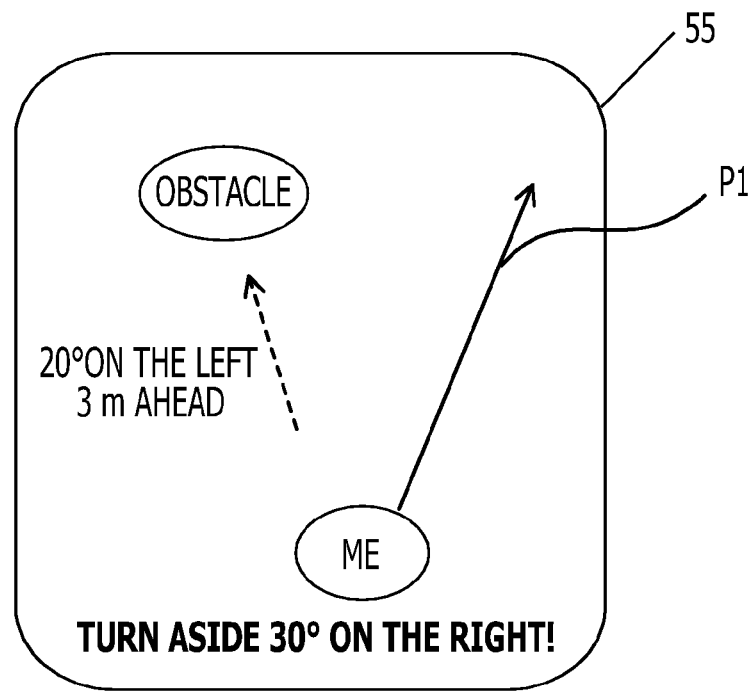
Figure 12A:
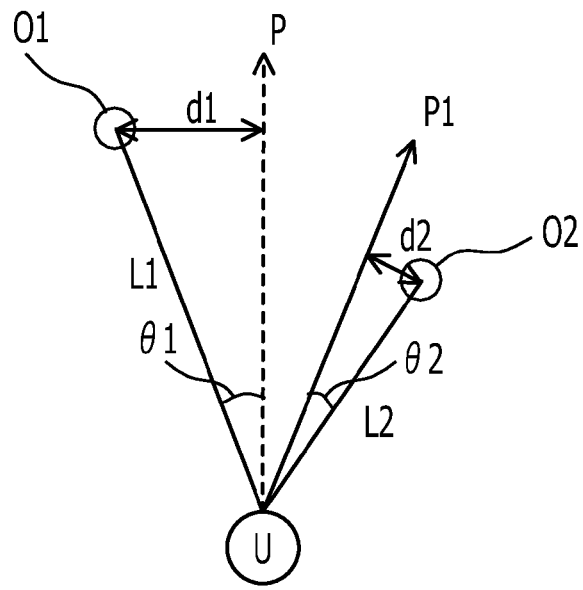
FIGS. 12A and 12B are overview diagrams illustrating a display content of a display of the mobile phone according to the second embodiment.
Figure 12B:
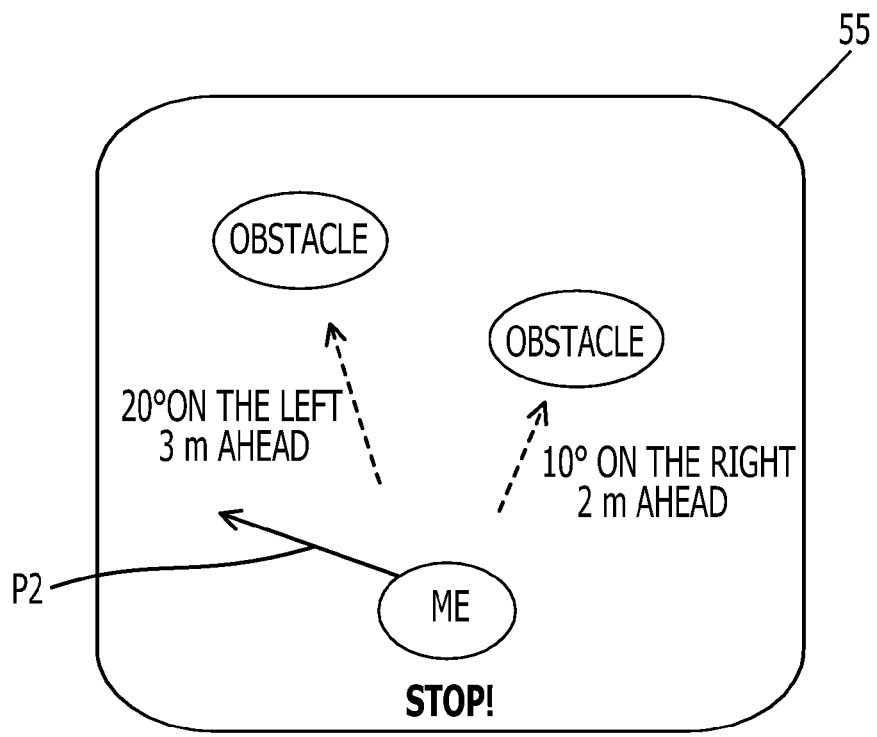

FIG. 10 is a flowchart of a display process of a collision avoiding method according to the second embodiment. FIGS. 11A and 11B illustrate the display content of the display 55 of the mobile phone 1 according to the second embodiment. FIG. 11A illustrates a positional relation of a user U, the walk path P, and the obstacle O1. FIG. 11B illustrates the display content of the display 55 corresponding to FIG. 11A. FIGS. 12A and 12B illustrate the display content of the display 55 of the mobile phone 1 according to the second embodiment. FIG. 12A illustrates a positional relation of the user U, the walk path P, and the obstacle O1, and the obstacle O2. FIG. 12B illustrates the display content of the display 55 corresponding to FIG. 12A.

In the second embodiment, if the distance from the mobile phone 1 to the obstacle is larger than the threshold value (No in Operation S207 according to the first embodiment), as illustrated in FIG. 10, the distance calculating unit 101e calculates the distance d1 of the perpendicular to the obstacle O1 and the walk path P based on the distance L1 to the obstacle O1 and on the angle θ1 of the obstacle O1 metered by the distance metering unit 120M (Operation S301).

The comparing unit 101f compares the distance d1 calculated by the distance calculating unit 101e to the threshold value d0 stored in the data storage unit 150 (Operation S302).

If the distance d1 between the obstacle O1 and the walk path P is smaller than the threshold value d0 (Yes in Operation S302), the output control unit 104 desires another walk path P1 and displays an arrow P1 indicating the walk path P1 on the display 55 as illustrated in FIG. 11 (Operation S303).

At this time, by comparing the distance between the obstacle O1 and the walk path P to the threshold value d0 for each angle while gradually shifting the angle of the walk path P by 5 degrees, the output control unit 104 may acquire another walk path P1 on which the user does not collide against the obstacle O1.

The output control unit 104 may display character information, for example, "Turn aside 30° on the right!" corresponding to the walk path P1, on the display 55. The output control unit 104 may display a mark of the user, for example, "Me", a mark of the obstacle O1, for example, "Obstacle", a distance to the obstacle O1, and a direction of the obstacle O1 on the display 55. The output control unit 104 may display a mark of the user, for example, "Me", a mark of the obstacle O1, for example, "Obstacle", a distance to the obstacle O1, and a direction of the obstacle O1 on the display 55.

If there is another obstacle O2 in front of the user and if a distance d2 between the walk path P1 and the obstacle O2 is smaller than the threshold value d0 (Yes in Operation S302), the letter information suggesting the user to stop walking, for example, "Stop!" may be displayed on the display 55. Alternatively, the walk path P2 in which the distance d2 from the obstacle O2 is larger than the threshold value d0 may be acquired and, as illustrated in FIG. 12(b), an arrow P2 indicating the walk path P2 may be displayed on the display 55.

On the other hand, if the distance d1 between the obstacle O1 and the walk path P is larger than the threshold value d0 (No in Operation S302), the user does not collide against the obstacle O1 even if the user of the mobile phone 1 walks on the walk path P. Therefore, the output control unit 104 does not display the collision avoiding method or the like.

As described above, according to the second embodiment, the distance to the obstacle to be avoided and the direction of the obstacle are displayed on the display 55 of the mobile phone 1 that the user is looking at. Therefore, even if the user pays attention on the display 55 of the mobile phone 1, the user may surely recognize the existence of the obstacle.

According to the second embodiment, if the obstacle is sufficiently far away from the walk path P, the display 55 does not display the collision avoiding method. Therefore, the display 55 does not display useless information that does not affect the walk of the user, so that the display area in use is not reduced.

Third Embodiment

Figure 13:
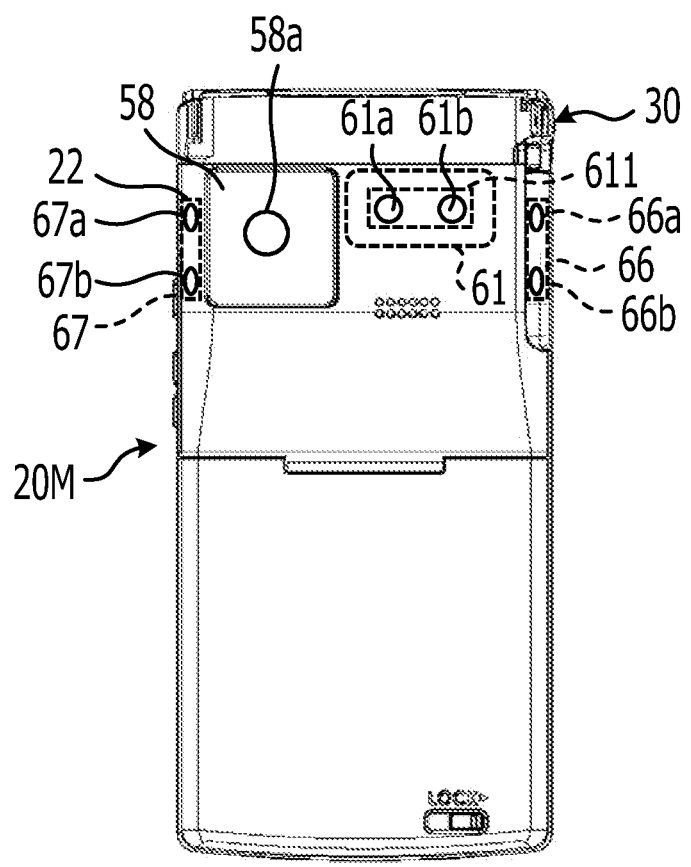
FIG. 13 is a back side diagram of a lower housing according to a third embodiment.

With reference to FIG. 13, a third embodiment will be described. If the configuration and function are equivalent to the first and second embodiments, the description is omitted.

FIG. 13 is a diagram of a back surface of a lower housing 20M according to the third embodiment.

As illustrated in FIG. 13, the mobile phone 1 according to the third embodiment further includes a left stereo camera 66 and a right stereo camera 67 in a left part and a right part of the mobile phone 1, respectively. The left stereo camera 66 and the right stereo camera 67 are provided inside the lower housing 20 of the mobile phone 1 and photograph the front of lenses 66a and 66b and lenses 67a and 67b, respectively. The lenses 66a and 66b and the lenses 67a and 67b are allocated on inclined surfaces 21 and 22 that are formed on the right side and the left side of the lower housing 20, respectively. The inclined surfaces 21 and 22 incline against the back surface of the lower housing 20 as a standard. Therefore, the left stereo camera 66 and the right stereo camera 67 having the lenses 66a and 66b and the lenses 67a and 67b, respectively, photograph the direction that is different from the direction of the stereo camera 611.

The mobile phone 1 according to the third embodiment, the collision avoiding process is executed for each photograph information photographed by the stereo camera 611, the left stereo camera 66, and the right stereo camera 67, respectively. That is, if the obstacle photographed by one of the stereo camera 611, the left stereo camera 66, and the right stereo camera 67 is within a detection range (threshold value), an alarm signal is output to at least one of the display 55, the speaker 56, and the vibrator 57. Based on the alarm signal, at least one of the display 55, the speaker 56, and the vibrator 57 notifies the user of the obstacle coming close. Accordingly, the collision avoiding may be achieved in a wider range that includes not simply the front of the mobile phone 1 but also the right side and the left side of the mobile phone 1.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A mobile electronic apparatus comprising:
a memory that stores a search range distance; and
a processor that executes a process including:
    determining whether a user of the mobile electronic apparatus is walking,
    acquiring a moving speed of the mobile electronic apparatus when the user is determined to be walking, wherein acquiring the moving speed includes:
        acquiring an activity intensity of a user of the mobile electronic apparatus on a basis of a value which is metered by an acceleration meter in the mobile electronic apparatus, and
        converting the activity intensity into the moving speed on a basis of a predetermined relation between the activity intensity and the moving speed;
    determining the search range distance on a basis of the moving speed, wherein determining the search range distance includes determining a distance corresponding to the moving speed acquired in the acquiring on a basis of a predetermined relation between the moving speed and the distance for specifying the search range;
    detecting an object existing within the search range distance, wherein detecting the object existing within the search range distance includes comparing a value, which is metered by a distance meter in the mobile electronic apparatus, to the distance determined in the determining the search range distance;

detecting whether a display unit of the mobile electronic apparatus is in an active state; and notifying that the object is detected in response to the display unit being detected to be in the active state and in response to the object existing within the search range distance being detected.

2. The mobile electronic apparatus according to claim 1, the process further comprising:

determining whether a user of the mobile electronic apparatus is walking, wherein the notifying notifies that the object is detected when the user is determined to be walking.

3. The mobile electronic apparatus according to claim 1, wherein the acquiring a moving speed acquires the moving speed when the display unit is detected to be in the active state.

4. The mobile electronic apparatus according to claim 1, wherein the determining the search range distance determines the search range distance when the display unit is detected to be in the active state.

5. A danger notifying method which is used in a mobile electronic apparatus, the method comprising:

determining whether a user of the mobile electronic apparatus is walking, acquiring a moving speed of the mobile electronic apparatus when the user is determined to be walking, wherein acquiring the moving speed includes:

acquiring an activity intensity of a user of the mobile electronic apparatus on a basis of a value which is metered by an acceleration meter in the mobile electronic apparatus, and converting the activity intensity into the moving speed on a basis of a predetermined relation between the activity intensity and the moving speed;

determining a search range distance on a basis of the moving speed, wherein determining the search range distance includes determining a distance corresponding to the moving speed acquired in the acquiring on a basis of a predetermined relation between the moving speed and the distance for specifying the search range;

detecting an object existing within the search range distance, wherein detecting the object existing within the search range distance includes comparing a value, which is metered by a distance meter in the mobile electronic apparatus, to the distance determined in the determining the search range distance;

detecting, using a processor, that a display unit of the mobile electronic apparatus is in an active state; and notifying that the object is detected in response to the display unit being detected to be in the active state and in response to the object existing within the search range distance being detected.

6. A non-transitory computer readable recording medium for storing a program causing a mobile electronic apparatus to execute a process, the process comprising:

determining whether a user of the mobile electronic apparatus is walking, acquiring a moving speed of the mobile electronic apparatus when the user is determined to be walking, wherein acquiring the moving speed includes:

acquiring an activity intensity of a user of the mobile electronic apparatus on a basis of a value which is metered by an acceleration meter in the mobile electronic apparatus, and converting the activity intensity into the moving speed on a basis of a predetermined relation between the activity intensity and the moving speed;

determining a search range distance on a basis of the moving speed, wherein determining the search range distance includes determining a distance corresponding to the moving speed acquired in the acquiring on a basis of a predetermined relation between the moving speed and the distance for specifying the search range;

detecting an object existing within the search range distance, wherein detecting the object existing within the search range distance includes comparing a value, which is metered by a distance meter in the mobile electronic apparatus, to the distance determined in the determining the search range distance;

detecting, using a processor, that a display unit of the mobile electronic apparatus is in an active state; and notifying that the object is detected in response to the display unit being detected to be in the active state and in response to the object existing within the search range distance being detected.

* * * * *